United States Patent
Albrecht et al.

(10) Patent No.: US 10,839,264 B2
(45) Date of Patent: Nov. 17, 2020

(54) SCALABLE FEATURE CLASSIFICATION FOR LASER SCANNING DATA AND DIGITAL ELEVATION MODELS

(71) Applicant: International Business Machines Corporation, Armonk, NY (US)

(72) Inventors: Conrad M. Albrecht, White Plains, NY (US); Sharathchandra Pankanti, Darien, CT (US); Marcus O. Freitag, Pleasantville, NY (US); Hendrik F. Hamann, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/186,237

(22) Filed: Nov. 9, 2018

(65) Prior Publication Data
US 2020/0151504 A1    May 14, 2020

(51) Int. Cl.
| | |
|---|---|
| *G06K 9/00* | (2006.01) |
| *G06K 9/62* | (2006.01) |
| *G06T 17/05* | (2011.01) |
| *G01S 17/42* | (2006.01) |
| *G01S 17/89* | (2020.01) |

(Continued)

(52) U.S. Cl.
CPC .............. *G06K 9/6256* (2013.01); *G01S 7/51* (2013.01); *G01S 17/42* (2013.01); *G01S 17/89* (2013.01); *G06K 9/6267* (2013.01); *G06N 20/00* (2019.01); *G06T 17/05* (2013.01); *G06T 2200/04* (2013.01); *G06T 2200/08* (2013.01)

(58) Field of Classification Search
CPC combination set(s) only.
See application file for complete search history.

(56) References Cited

U.S. PATENT DOCUMENTS

| | | | |
|---|---|---|---|
| 7,352,892 | B2 | 4/2008 | Zhang et al. |
| 8,582,808 | B2 | 11/2013 | McLaughlin et al. |

(Continued)

OTHER PUBLICATIONS

Alexandre Guyot et al., "Detecting neolithic burial mounds from lidar-derived elevation data using a multi-scale approach and machine learning techniques," Remote Sensing, vol. 10, No. 2, Feb. 2018, 225, 19 pp.

(Continued)

*Primary Examiner* — Alex Kok S Liew
(74) *Attorney, Agent, or Firm* — Randall Bluestone; Michael J. Chang, LLC (57) ABSTRACT

Scalable feature classification for 3D point cloud data is provided. In one aspect, a method for rasterizing 3D point cloud data includes: obtaining the 3D point cloud data; generating a digital elevation model (DEM) from the 3D point cloud data; decomposing the DEM into local and global fluctuations to obtain a local DEM; generating geo-referenced shapes by automatically thresholding the local DEM; cropping and normalizing the local DEM using minimum bounding boxes derived from the geo-referenced shapes and manual annotations from subject matter experts to create a cropped DEM; and linking geo-spatially tagged labels from the subject matter experts to the cropped DEM. These data can be then directly fed into a system having an ensemble of artificial neural networks. By way of example, a scalable ecosystem is presented on the basis of the geo-spatial platform IBM PAIRS.

16 Claims, 8 Drawing Sheets

(51) Int. Cl.
*G01S 7/51* (2006.01)
*G06N 20/00* (2019.01)

(56) References Cited

U.S. PATENT DOCUMENTS

| | | | |
|---|---|---|---|
| 9,082,188 | B2 | 7/2015 | Mueller et al. |
| 9,589,238 | B2 | 3/2017 | Nugent |
| 9,842,282 | B2 | 12/2017 | Liu et al. |
| 2009/0074393 | A1* | 3/2009 | Park ............... H04N 5/23212 396/104 |
| 2009/0089017 | A1* | 4/2009 | Kelley ............... G06T 17/05 703/1 |
| 2012/0281907 | A1* | 11/2012 | Samples ............ G06K 9/00201 382/159 |
| 2016/0005145 | A1* | 1/2016 | Seitz ................ G06T 3/0093 382/154 |
| 2016/0249040 | A1* | 8/2016 | Mesher ............. H04N 13/189 |
| 2017/0277951 | A1 | 9/2017 | Wagner et al. |
| 2018/0217233 | A1 | 8/2018 | Lee |

OTHER PUBLICATIONS

Jeonghyeok Kim et al., "A Trail Detection Using Convolutional Neural Network," Proceedings of the 7th International Conference on Emerging Databases, Oct. 2018, pp. 275-279.

Benjamin Commandre et al., "Manhole Cover Localization in Aerial Images with a Deep Learning Approach," ISPRS Hannover Workshop: HRIGI 17—CMRT 17—ISA 17—EuroCOW 17, Jun. 2017, vol. 42, pp. 333-338.

Harmon et al., "Lidar for Archeological Landscape Analysis: A Case Study of Two Eighteenth-Century Maryland Plantation Sites," American Antiquity, vol. 7, No. 4 (Oct. 2006), pp. 649-670.

Doneus et al., "Archeological prospection of forested areas using full-waveform airborne laser scanning," Journal of Archeological Science 35 (Apr. 2008), pp. 882-893.

Simonyan et al., "Very Deep Convolutional Networks for Large-Scale Image Recognition," ICLR Apr. 2015 arXiv:1409.1556, https://arxiv.org/abs/1409.1556 (14 pages).

Bewley et al., New light on an ancient landscape: Lidar survey in the Stonehenge world heritage site, Antiquity, 79:636-647 (Sep. 2005).

Trier, et al., "Automatic detection of pit structures in airborne laser scanning data," Archaeological Prospection, 19:103-121, Apr. 2012.

Fisher et al., "Identifying ancient settlement patterns through LiDAR in the mosquitia region of Honduras," PLoS ONE Aug. 11, 2016 (37 pages).

Lasaponara et al., "Flights into the past: full-waveform airborne laser scanning data for archeological investigation," Journal of Archeological Science 38 (Sep. 2011) 2061-2070.

* cited by examiner

SCALABLE FEATURE CLASSIFICATION FOR LASER SCANNING DATA AND DIGITAL ELEVATION MODELS

FIELD OF THE INVENTION

The present invention relates to analysis of three-dimensional (3D) data, and more particularly, to scalable feature classification for 3D point cloud data such as laser scanning, e.g., LiDAR data, and digital elevation models.

BACKGROUND OF THE INVENTION

Airborne laser scanning tools such as LiDAR (light detection and ranging) imaging are emerging as a measurement modality for exploration. For instance, LiDAR measurements can be used to survey a large geographic area to identify landmarks, objects, artifacts, etc. of interest.

There is an increased availability of digital elevation models (DEMs) due to the launch of synthetic aperture radar (SAR) satellites such as the European Space Agency's Sentinel-1. SAR is a type of radar that can be used, among others, to create two-dimensional topographical images.

Existing practices are generally centered around the visual inspection of DEMs by subject matter experts for the detection of objects of interest, such as archeological structures. For instance, the image processing techniques such as hill shading can be used to accentuate artifacts of interest. Hill shading is a gray shaded relief map used to indicate relative contours such as hills, slopes, etc. However, visual inspection of (noisy) LiDAR or SAR measurements are a) error prone and not consistent and b) time consuming.

Therefore, improved techniques for exploration using LiDAR and SAR measurement data would be desirable.

SUMMARY OF THE INVENTION

The present invention provides scalable feature classification for three-dimensional (3D) point cloud data. In one aspect of the invention, a method for rasterizing 3D point cloud data is provided. The method includes: obtaining the 3D point cloud data; generating a digital elevation model (DEM) from the 3D point cloud data; decomposing the DEM into local and global fluctuations to obtain a local DEM; generating geo-referenced shapes by automatically thresholding the local DEM; cropping the local DEM using minimum bounding boxes derived from the geo-referenced shapes and manual annotations from subject matter experts to create a cropped DEM; and linking geo-spatially tagged labels from the subject matter experts to the cropped DEM. Supervised learning can then be applied to the cropped local DEM imagery.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for scalable feature classification for three-dimensional (3D) point cloud data such as laser scanning, e.g., LiDAR data, and digital elevation models. The present techniques can be implemented in a wide variety of applications. For instance, as highlighted above, airborne laser scanning tools such as LiDAR (light detection and ranging) imaging are used to survey geographic areas in order to detect areas of interest. One example would be in the context of archeological exploration, researchers can use the laser scanning data to identify geographical areas of interest in order to locate man-made structures such as ancient buildings, which might be located beneath a cover of vegetation. Other types of landscapes can be similarly analyzed, such as modern urban areas.

Furthermore, the present techniques can be more generally applied to the analysis of any 3D data with elevation information. For instance, laser scanning data or, e.g., scanning tunneling microscope data obtained of electronic devices can be analyzed by the present system to identify components (e.g., chip, processor, transistor, etc.) of interest. Thus, the applications are vast and should not be construed as being limited to those provided in the below examples.

As will be described in detail below, the present techniques involve in a first stage performing semi-automated filtering of 3D point cloud data such as, e.g., from LiDAR measurements, using expert knowledge to identify areas of interest. Geo-referenced shapes are automatically generated using digital elevation models (DEMs). These shapes are equivalent to contour lines, i.e., lines of constant elevation. By "geo-referenced" it is meant that the shapes are associated with locations in the physical space. "Subject matter experts" can then filter these geo-referenced shapes based on their own domain knowledge. By "subject matter experts," it is meant that a person having expertise in the areas of interest can analyze the geo-referenced shapes and identify areas of interest. For instance, in the context of archeological exploration, archeologists familiar with a particular forested area can identify ancient structures for mapping human artifacts. Similarly, knowledge from crowdsourced statistics on buildings in an urban space can be gleaned using applications such as OpenStreetMap which contains a vast amount of volunteered geographic information. On a smaller scale, chip designers can provide knowledge on electronic device architecture.

In a second stage, supervised, geo-spatial (deep) machine learning is then performed whereby, based on the geo-referenced shapes from above, (normalized) images bounded by a minimum bounding box are constructed to train an ensemble of (deep learning) classifiers such as a collection of deep convolutional neural networks. Domain knowledge from the subject matter experts is fed into this supervised learning procedure. By way of example only, big geo-spatial data technologies like PAIRS available from International Business Machines Corporation (hereinafter "IBM PAIRS") and Apache Spark™ SQL (hereinafter "Spark SQL") can be employed for this task. IBM PAIRS is a platform specifically designed for massive geospatial-temporal data, query and analytics services. Spark SQL is a tool that can be used to query structured data using structured query language (SQL).

Third, scalable geo-spatial object detection can then be performed in an unknown terrain. For instance, semi-automated filtering of 3D point cloud data (as described in first stage above) is applied to the unknown terrain to massively reduce the spatial area to be investigated. Application of the classifier trained in the second stage (see above) is then used to perform automated geo-spatial object detection for, e.g., map generation. The result is injected back into a big geo-spatial data store such as IBM PAIRS.

Figure 1:
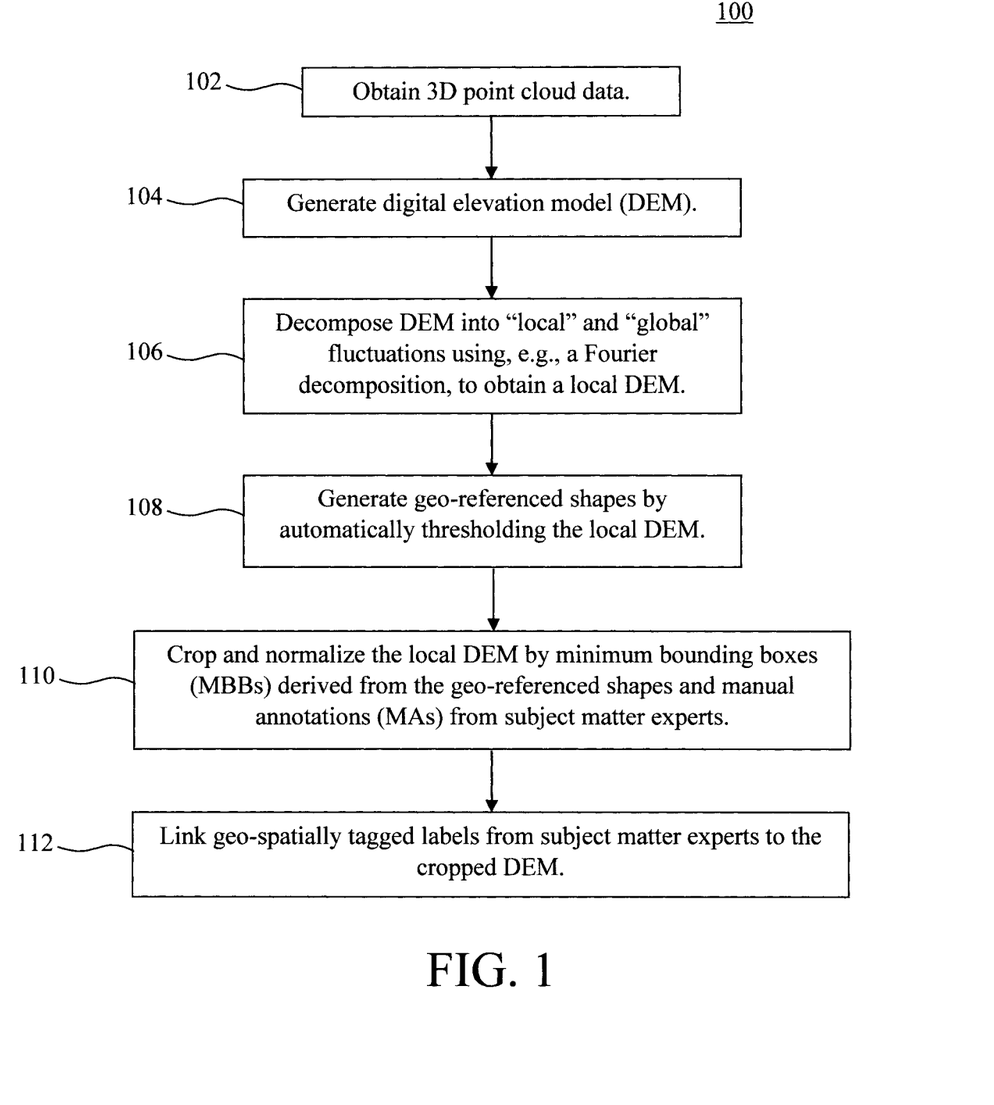
FIG. 1 is a diagram illustrating exemplary methodology for rasterizing three-dimensional (3D) point cloud data according to an embodiment of the present invention.

FIG. 1 illustrates an exemplary methodology 100 for rasterizing 3D point cloud data in accordance with the present techniques. Advantageously, representations are generated that are both a) insensitive to global terrain and which are b) normalized for consumption by machine learning algorithms for, e.g., classification.

By "rasterizing" we refer to the following process: Given the fact that the 3D point cloud includes a set of irregular points not necessarily commensurate with, e.g., a regular grid of points in 3D, in a first step the 3D data is filtered such that the associated elevation data can be projected to two dimensions (2D), e.g., the geo-referenced space of latitude and longitude coordinates. Thereafter, this potentially still irregular points in 2D with associated, unique elevation values get interpolated into a surface that has values at grid points regularly spaced in 2D. For example, the lower left corner of the grid could be (latitude, longitude)=(50.4°, −90°) and the pixel resolution in latitude and longitude direction be 0.1° and 0.3°, respectively. Then, the neighboring point East is (50.4°, −89.7°), the one South (50.3°, −90°), the one North-West (50.5°, 90.3°), etc.

In step 102, the 3D point cloud data is obtained. According to an exemplary embodiment, in step 102 the 3D point cloud data is ingested and indexed into the IBM PAIRS technology employing Spark SQL. In step 104, a digital elevation model (DEM) is generated by (binary) classification of the 3D point cloud data into "bare ground" and "above bare ground."

According to one non-limiting example, the 3D point cloud date is obtained in step 102 using an airborne laser scanning tool such as LiDAR. Airborne laser scanning of forested areas can penetrate the vegetation canopies allowing the underlying terrain elevation to be accurately modeled. See, for example, Doneus et al., "Archeological prospection of forested areas using full-waveform airborne laser scanning," Journal of Archeological Science 35 (April 2008), pps. 882-893, the contents of which are incorporated by reference as if fully set forth herein. For example, as an airplane with LiDAR flies over a geographical area, the LiDAR projects a laser onto the ground and counts the reflection it gets back (i.e., returns). For forested areas, leaves are semi-reflective, while areas such as bodies of water are fully absorbing. A plain surface such as a rooftop can be (almost) fully reflective. Thus, by analyzing time-of-flight of the laser, these different aspects of the terrain can be discerned. See, for example, FIG. 2.

Figure 2:
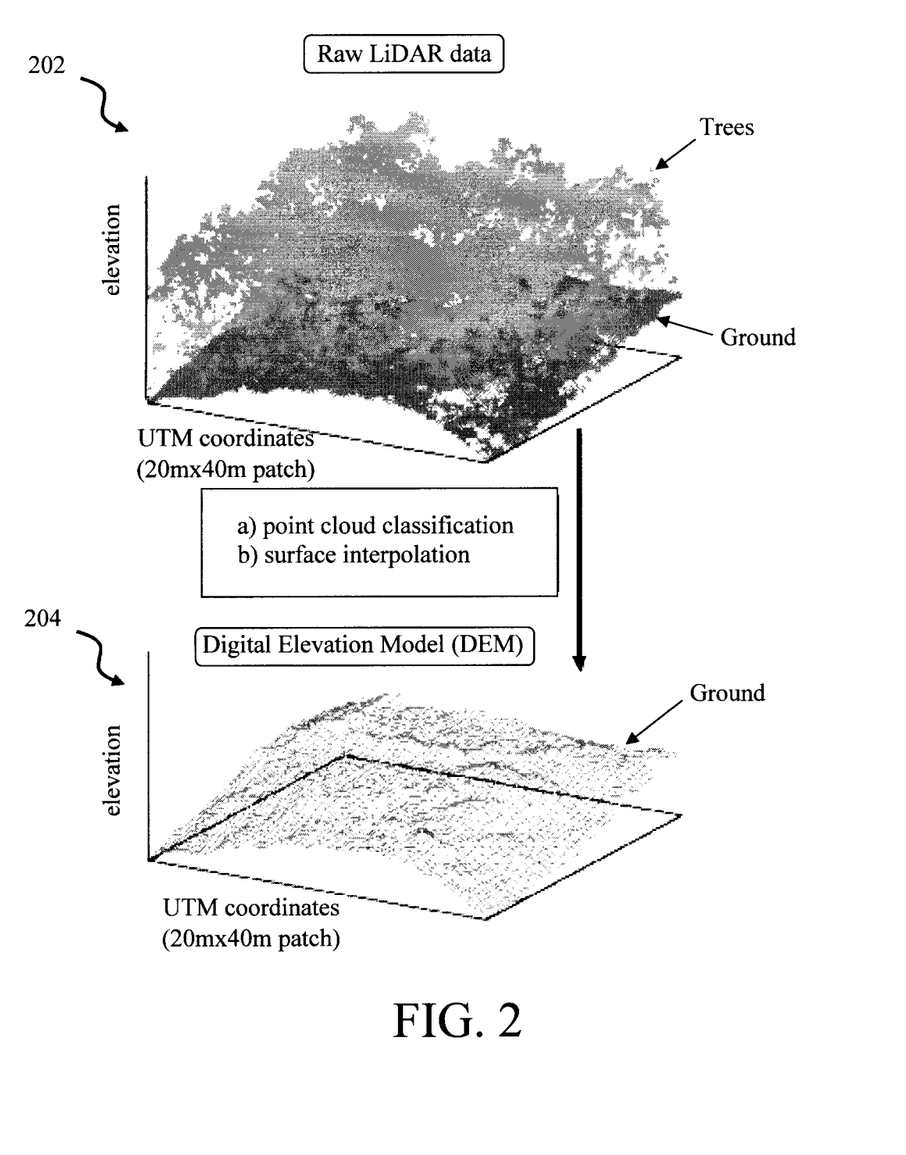
FIG. 2 is a diagram illustrating a digital elevation model (DEM) having been generated from the 3D point cloud data according to an embodiment of the present invention.

Referring to FIG. 2, the raw LiDAR measurements 202 (obtained in step 102 of methodology 100) are shown representing (geo-referenced) elevation data $X_{ij} \equiv (x_i, y_i, z_{ij})$ (potentially including multiple returns j=0, 1, . . . ) of both ground structures as well as other structures, e.g., foliage (Trees). Of interest is the return that goes the deepest as this represents the Ground measurements, and all other measurements (such as those pertaining to Trees) can be removed. Specifically, the last return measurements are considered to be originating from the ground structures, $X_{ij} \rightarrow X_i \equiv (x_i, y_i, z_{i0})$ with $z_{ij} < z_{ij'}$, $\forall i, j < j'$.

However, the last return measurements are not always well determined, e.g., due to presence of non-reflective surfaces in the environment. Consequently, point measurements are irregularly spaced in the lattice of coordinates (x, y). Accordingly, interpolations of $X_i$, e.g., using nearest neighbors, is used to convert the $X_i$ to a regular grid X (x, y), a (global) DEM 204 of the Ground (as per step 104 of methodology 100).

This approach does not filter outliers, because there exist series $z_{ij}$ where the last return value $z_{i0}$ does not represent bare ground. Instead, as described in conjunction with the description of FIG. 3 below, the present processing pipeline applies a threshold $\Delta_0$ that cuts off those peaks. To improve the image quality one could apply classical image filters as, e.g., a linear Gaussian or a non-linear Median filter. For computational scalability, the simplified strategy of taking $z_{i0}$ has the benefit of increased speed as compared to more elaborate DEM generation techniques.

Referring back to methodology 100 of FIG. 1, in step 106 DEM is decomposed into "local" and "global" fluctuations by means of, e.g., a Fourier transform, to obtain a local DEM, and in step 108 geo-referenced shapes are generated by automatically thresholding the local DEM by means of an extremum analysis of a "number of contours" histogram.

Namely, the overall terrain structure is less important since what is of interest is the local terrain. For example, in the context of archeological exploration one is only interested in the local terrain (e.g., a hillside) containing the object(s) of interest (e.g., a human artifact such as a wall located on the hillside). As such, the global terrain is removed from the measurements by removing the low-frequency data. See FIG. 3.

Figure 3:
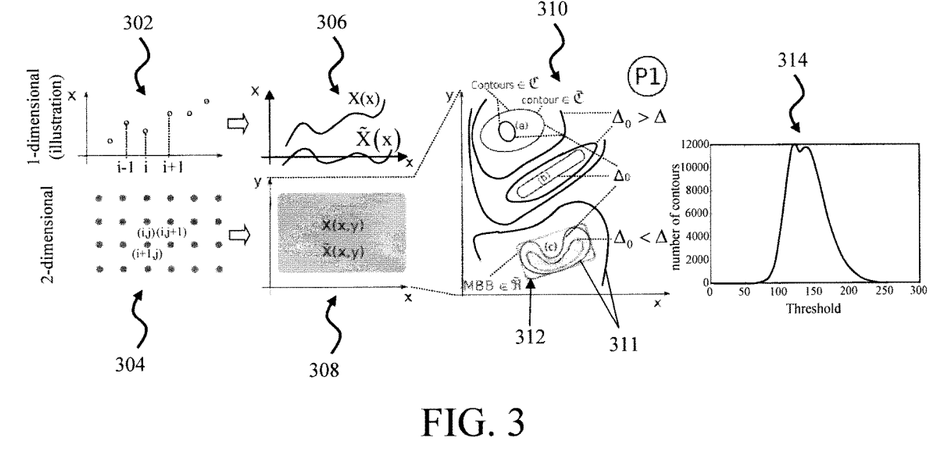
FIG. 3 is a diagram illustrating the DEM having been decomposed into the local and global fluctuations to obtain a local DEM, and geo-referenced shapes having been generated by automatically thresholding the local DEM by means of an extremum analysis of a "number of contours" histogram according to an embodiment of the present invention.

Referring to FIG. 3, local structure is obtained by subtracting a) the mean of the neighborhood patch from each grid point on the DEM (see plot 302) or b) apply a high pass filter to the (two-dimensional) Fourier transform of X (x, y) (see plot 304). The result, $\tilde{X}$ (x, y) (see plots 306 and 308, respectively) is referred to herein as the "local DEM" (as per step 106 of methodology 100). The notions local and neighborhood are defined by the application's context. For example, if one aims to detect wall or house-like structures, then the length scale is on the order of meters.

Given a threshold $\Delta_0$, the process determines a specific set of contours, also referred to as "geo-referenced shapes" in this disclosure (see details above), $\mathfrak{C} \equiv \{C_k : \tilde{X}(x, y) = \Delta_0\}$ 311 (used as a basis for the statistics "number of contours" histogram 310, by way of example), which gets further reduced based on their hierarchy: $\bar{\mathfrak{C}} \equiv \{C_k : C_k \cap C_{k'} \neq 0 \Rightarrow C_{k'} \subset C_k \forall C_k \in \mathfrak{C}\}$ from which minimum bounding boxes (MBB) 312 $\bar{\mathfrak{R}} \equiv \{R_k : A(R_k) \leq A(R) \forall R \supset C_k \in \bar{\mathfrak{C}}\}$ are derived where $R_k$ defines a rectangle and $A(R_k)$ its area (as per step 108 of methodology 100). This process for obtaining the MBBs 312 will be referenced in later embodiments as process P1.

The threshold $\Delta_0$ can be chosen, e.g., empirically to locally or globally optimize the number of contours. See, for example, plot 314 with the threshold (arbitrary units) vs. number of contours. It is notable that the characteristics of the MBBs $R_k$ such as, e.g., area $A(R_k)$, aspect ratio, circumference, number of contours contained for given $\Delta_0$, $A(C_k)/A(R_k)$, etc. can be used as a) filter criteria and b) features to be fed into machine learning algorithms.

Referring back to methodology 100 of FIG. 1, in step 110 the local DEM is cropped and normalized by the (almost) MBBs 312 derived from the geo-referenced shapes that were previously defined and manual annotations from subject matter experts, and in step 112 geo-spatially tagged labels from the subject matter experts are linked to the cropped DEM. See FIG. 4.

Figure 4:
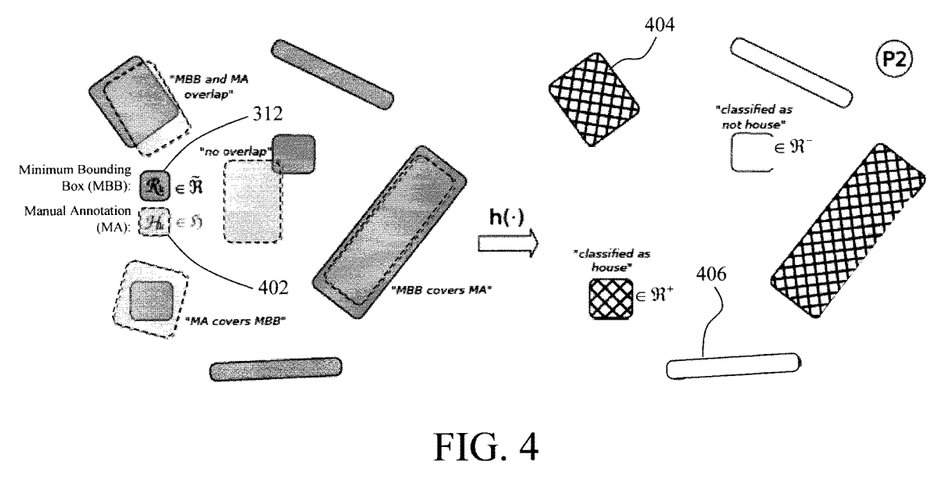
FIG. 4 is a diagram illustrating the local DEM having been cropped and normalized by minimum bounding boxes derived from the geo-referenced shapes and manual annotations from subject matter experts, and geo-spatially tagged labels from the subject matter experts having been linked to the cropped DEM according to an embodiment of the present invention.

Namely, the MBBs $\bar{\mathfrak{R}}$ are used to crop $\tilde{X}(x, y)$ to obtain the image set $\mathfrak{I} \equiv \{I_k(x, y): \tilde{X}(x, y) \subseteq R_k \forall R_k \in \bar{\mathfrak{R}}\}$ (as per step 110 of methodology 100). As shown in FIG. 4, a (binary) feature classification function h(Y) is defined that returns 1 (True) for Y contains a feature, e.g., a wall or a house, and 0 (False) for feature not present. A set of manual annotations (MAs) 402 from subject matter experts, e.g., archeologists, are considered that identify and geo-reference ancient structures by field surveys: $\eta \equiv \{H_k : h(H_k) = 1\}$. Thus, Y is a set of (geo-referenced) polygons (e.g., the MBBs 312 and manual annotations (MAs) 402). It is notable however that the present techniques easily extended beyond binary classification.

In order to classify the elements of J we particularly use $h(R_k) = 1$ if $A(R_k \cap H_k)/A(R_k) \geq a_1$ and $A(R_k \cap H_k)/A(H_k) \geq a_2$. Elsewise, $h(R_k)$ returns False. $R_k$ is the MBB corresponding to the image $I_k$, and $H_k$ references any manual annotation (MA) $H_k \in \eta$ with $R_k \cap H_k \neq 0$. Reformulated in plain text, the parameters $a_1$ and $a_2$ control the notion of "overlap." In particular, $a_1$ is a threshold for the fraction of the overlap area of the MBB and MA vs. the area of the MBB. And $a_2$ is a threshold for the fraction of the overlap area of the MBB and the MA vs. the area of the MA. By enforcing both thresholds to be passed in order to classify the MBB as house, wall, etc., it is ensured that MA and MBB "sufficiently" overlap on the one hand, and that in the case where one contains the other, they are comparable in size, on the other hand. In practice one "symmetrizes" the relation by setting $a_1 = a_2 = a = \text{const.} = 0.8$, i.e., roughly speaking, the overlap of the MBB and the MA needs to be at least 80%.

Thus, as shown in FIG. 4 several different outcomes are anticipated. For instance, in instances where an MBB 312 and MA 402 overlap, where an MBB 312 covers an MA 402, or where an MA 402 covers an MBB 312, the outcome is a positive result, i.e., "classified as house" as in features 404. However, in instances where there is no overlap between an MBB 312 and MA 402, then the outcome is a negative result, i.e., "classified as not house" as in features 406. The geo-spatially tagged labels from the MAs 402 (e.g., wall, house, etc.) are linked to the cropped DEM (as per step 112 of methodology 100). This process for classifying the MBBs 312 will be referenced in later embodiments as process P2.

Figure 5:
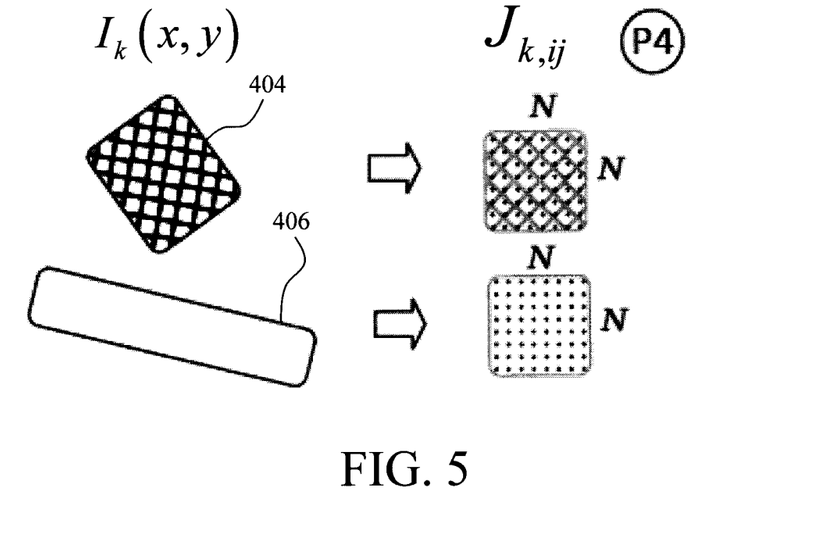
FIG. 5 is a diagram illustrating the local DEM having been normalized according to an embodiment of the present invention.

As shown in FIG. 5, the feature vector the present process supplies to a deep learning algorithm is constructed from an affine transformation $f_{N(1)}$ of the $I_k(x, y)$ to the space $\mathbb{N}_N^2 \equiv \mathbb{N} \cap (0, N] \times \mathbb{N} \cap (0, N]$, i.e., an image with aspect ratio 1 and a number of $|\mathbb{N}_N^2| = N^2$ pixels: $\mathfrak{I} \rightarrow \mathfrak{J} \equiv \{J_{k,ij} = (f_N(I_k))_{ij} \in \mathbb{N}_N^2\}$. Normalization is then applied to each $J_{k,ij}$ such that the normalized images have vanishing mean $\langle J_k \rangle = 0$. $\langle \cdot \rangle$ denotes averaging over image pixels, i.e., $$\langle J_k \rangle = \frac{1}{N^2} \sum_{i,j} J_{k,ij}.$$

This process for normalizing the local DEM will be referenced in later embodiments as process P4.

Figure 6:
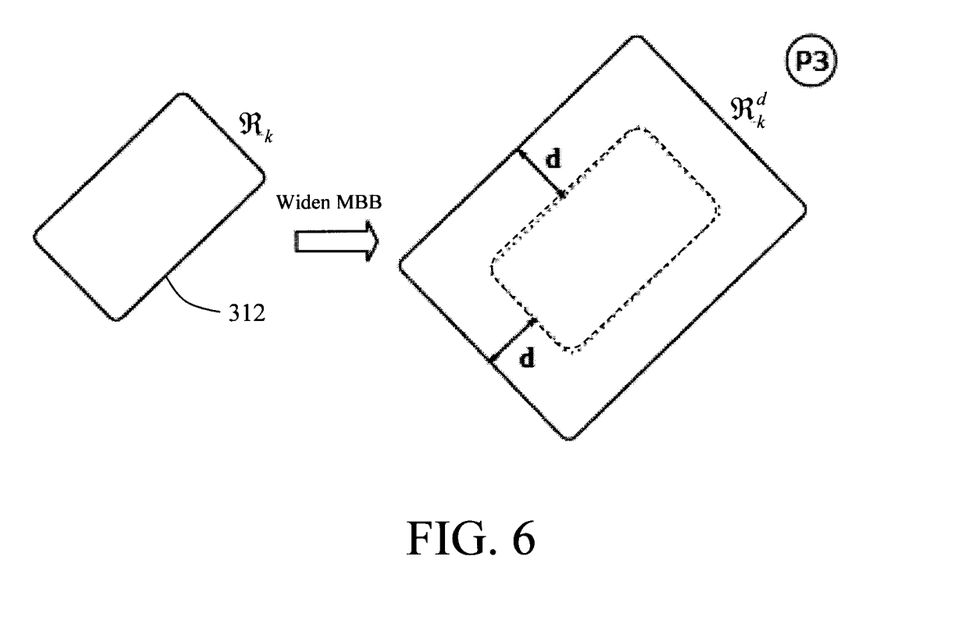
FIG. 6 is a diagram illustrating a number of training images having been multiplied by W widen operations according to an embodiment of the present invention.

In order to a) increase the number $|\mathfrak{J}|$ of images for training and b) to take into account the feature's geo-spatial context, the number of elements in the set $\bar{\mathfrak{R}}$ are multiplied by expanding each $R_k \in \bar{\mathfrak{R}}$ to include the surroundings of $R_k$ up to a distance d, denoted by $R_k^d$. See FIG. 6. To this end, $A(R_k)$ gets enlarged by an outward parallel shift of the boundary faces $\partial R_k$ by a distance d. This process for multiplying the number of training images by W widen operations will be referenced in later embodiments as process P3.

Figure 7:
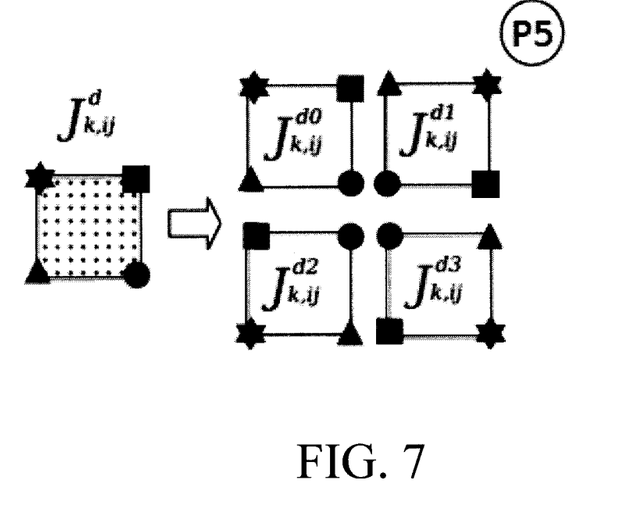
FIG. 7 is a diagram illustrating the process to increase the number of training images by M rotations according to an embodiment of the present invention.

Another multiplication factor of 4 is achieved by rotating each $J_k^d$, according to:

$$J_{k,ij}^{d0} \equiv J_{k,ij}^d$$

$$J_{k,ij}^{d1} \equiv J_{k,jN-i}^d$$

$$J_{k,ij}^{d2} \equiv J_{k,N-ji}^d$$

$$J_{k,ij}^{d3} \equiv J_{k,N-iN-j}^d,$$

where $J_k^d$ corresponds to a given $I_k^d$ that got cropped from a widened MBB $R_k^d$. See FIG. 7. This process for multiplying the number of training images by M rotations will be referenced in later embodiments as process P5.

The cropped DEM with geo-spatially tagged labels can then be supplied to a deep learning algorithm such as an artificial neural network (ANN), or any other classification algorithm such as, e.g., support vector machines, for machine learning model training, and use of the trained model for geo-spatial object detection in an unknown terrain. In machine learning and cognitive science, artificial neural networks (ANNs) are a family of statistical learning models inspired by the biological neural networks of animals, and in particular the brain. ANNs may be used to estimate or approximate systems and cognitive functions that depend on a large number of inputs and weights of the connections which are generally unknown.

ANNs are often embodied as so-called "neuromorphic" systems of interconnected processor elements that act as simulated "neurons" that exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Instead of utilizing the traditional digital model of manipulating zeros and ones, ANNs create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 8:
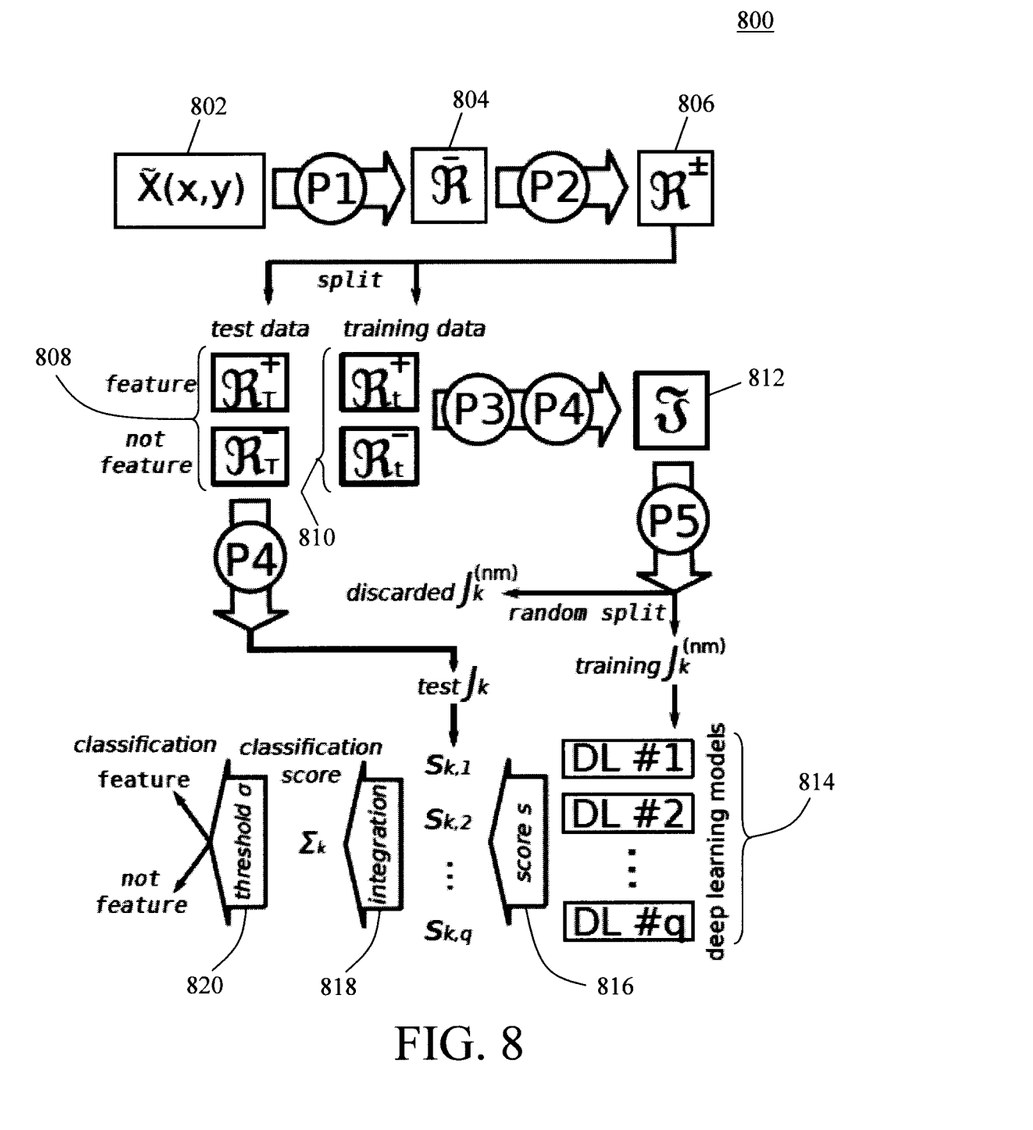
FIG. 8 is a diagram illustrating exemplary methodology for machine-learning model training and operation according to an embodiment of the present invention.

An exemplary methodology 800 for model training and operation is provided in FIG. 8. As shown in FIG. 8, the process begins in step 802 with a local DEM $\tilde{X}(x, y)$ of a given geo-spatial region (obtained as described in detail above). In step 804, MBBs $\bar{\mathfrak{R}}$ are obtained as detailed in process P1, described above. In step 806, the MBBs $\bar{\mathfrak{R}}$ are classified according to process P2 described above, such that $\bar{\mathfrak{R}} = \bar{\mathfrak{R}}^+ \cup \bar{\mathfrak{R}}^-$.

$\bar{\mathfrak{R}}^\pm$ is split into a training and test/operation data set: $\bar{\mathfrak{R}}_T^\pm$ and $\bar{\mathfrak{R}}_t^\pm$ in steps 808 and 810, respectively, such that $\bar{\mathfrak{R}}_T^+ \cup \bar{\mathfrak{R}}_t^+ = \bar{\mathfrak{R}}^+$, $\bar{\mathfrak{R}}_T^- \cup \bar{\mathfrak{R}}_t^- = \bar{\mathfrak{R}}^-$. While the classified MBBs for operation are transformed into images $J_k$ by process P4, described above, only the number of training images get multiplied by W widen operations P3 (see step 812), and m rotations P5 as described above in addition (denoted by $J_k^{(wm)}$ with w=1, . . . , W and m=1, . . . , M).

Given the set of all $J_k^{(nm)}$, it is randomly partitioned into two subsets, q number of times. One subset of each q partition gets discarded, and the other one is used to train a model (DL) such as, e.g., a fully connected $f_c$ deeply learnt VGG network (see step 814), a specific implementation of a convolutional neural network (cf. Simonyan et al., "Very Deep Convolutional Networks for Large-Scale Image Recognition," ICLR April 2015 (14 pages) arXiv:1409.1556, https://arxiv.org/abs/1409.1556, the contents of which are incorporated by reference as if fully set forth herein), which is a subclass of ANNs.

The q models DL #1, DL #2, . . . , DL #q take $J_k$ as input and return scores $s_{k,1}, s_{k,2}, \ldots, s_{k,y}$ (see step 816) in a given interval, say [0, 1], that represents the confidence of $J_k$ containing the feature (such as, e.g., wall, house, etc.). For fixed k these values can be integrated (see step 818) over to a value $\Sigma_k$ by different means such as, e.g., $$\sum_k^{opt} \equiv \max_i \{s_{k,i}\}_{i=1\ldots q}, \sum_k^{pes} \equiv \min_i \{s_{k,i}\}_{i=1\ldots q}, \sum_k^{rbt} \equiv \langle s_k \rangle.$$

Finally, a fixed threshold $\sigma \in [0, 1]$ (see step 820) is used to perform the (binary) classification of $J_k$ according to $\Sigma_k \leq \sigma \Rightarrow \text{False}_k$ (not feature) and $\Sigma_k > \sigma \Rightarrow \text{True}_k$ (feature).

Figure 9:
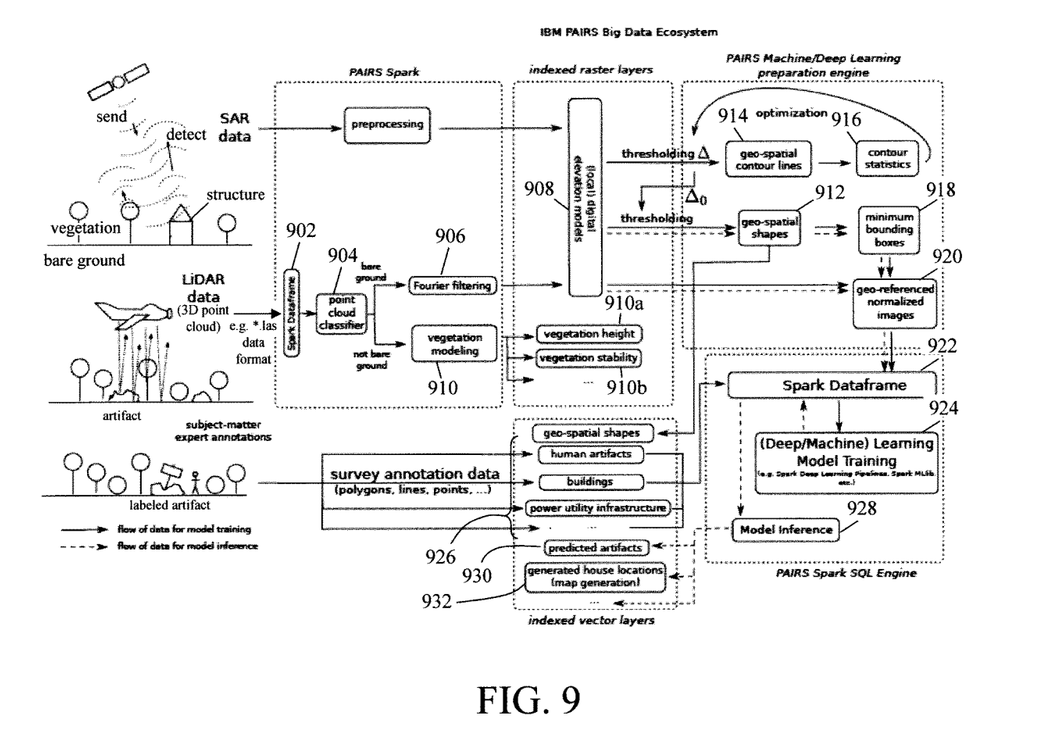
FIG. 9 is a diagram illustrating a scalable implementation of the present techniques for rasterizing 3D point cloud data, and machine-learning model training and operation according to an embodiment of the present invention.

A scalable implementation of the present techniques is now described by way of reference to methodology 900 of FIG. 9. In FIG. 9, the flow of data for model training is depicted using solid arrows, and the flow of data for model reference is depicted using dashed arrows.

As described above, a 3D point cloud data is obtained, e.g., using LiDAR, and ingested into the IBM PAIRS technology employing Spark SQL. See step 902. From this data, a DEM is generated by (binary) classification of the 3D point cloud data into "bare ground" and "above bare ground," i.e., "not bare ground." See step 904.

Alternatively, the DEM might be obtained by means of remote sensing technology, such as, e.g., SAR—an active remote sensing technique employing radar to send out and receive back electro-magnetic radiation for probing the Earth's surface. In particular, the European Space Agency launched the satellite "Sentinel-1A" in April 2014 to continuously collect data up to date. Several preprocessed products exist such as e.g. "Ground Range Detected" (GRD, https://sentinel.esa.int/web/sentinel/user-guides/sentinel-1-sar/product-types-processing levels/level-1) that can be directly be used as DEM for the present techniques. Of course, the corresponding preprocessing steps can be performed directly in the IBM PAIRS Big Data ecosystem as well leveraging, e.g., Apache Spark. Yet another source for a DEM to illustrate potential data sources is, e.g., scanning tunneling microscope measurements from nano-scale structures of electronic devices.

The DEM is then decomposed into "local" and "global" fluctuations by means of, e.g., a Fourier transform (see step 906), to obtain a local DEM (see step 908). Notably, the data classified as "not bare ground" can be used for vegetation modeling (see step 910), such as to determine the vegetation height (see step 910a), the vegetation stability (see step 910b), etc. By way of example, "vegetation stability" is the notion of assigning numerical quantities to (LiDAR) point cloud data representing vegetation such as Trees. Based on the distribution of the point cloud data one might infer and learn models (e.g., using ANNs) to rate the stability of such Trees regarding, e.g., impact by weather in order to rate the probability that Trees get dislocated during events of storms.

Geo-referenced (i.e., geo-spatial) shapes are generated (see step 912) by automatically thresholding the local DEM (from step 908) by means of an extremum analysis of a "number of contours" histogram. As shown in FIG. 9, this thresholding involves automatically optimizing the threshold for a particular test area based on the number of geo-spatial contour lines. For instance, after the local DEM has been generated, an initially arbitrary threshold Delta (e.g., the mean value of the local DEM, $\langle \text{DEM} \rangle$) is used to threshold the local DEM in order to obtain the geo-referenced shapes. Then these are, e.g., counted—more generally, statistics is applied on them. Then the threshold Δ is varied based on some optimization rule, e.g., "maximize the number of contours", cf. diagram 314. When this iterative process converged the method ends up with a $\Delta_0$ that is eventually used to create geo-referenced shapes, and from that MBBs which are used for machine learning training.

MBBs are derived from the geo-referenced shapes (see step 918) and used to normalize the local DEM (see step 920). The normalized DEM is then fed into a big geo-spatial data technology like IBM PAIRS technology employing Spark SQL (see step 922) and used to train an ensemble of deep learning classifiers (see step 924). Domain knowledge from subject matter experts is fed into this supervised learning procedure. For instance, subject-matter expert annotations can be provided regarding human artifacts, buildings, power utility infrastructure, etc. See step 926. For inference in unknown terrain (see step 928), the trained classifiers are used to perform automated geo-spatial object detection, e.g., for predicting artifacts (see step 930), map generation (see step 932), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
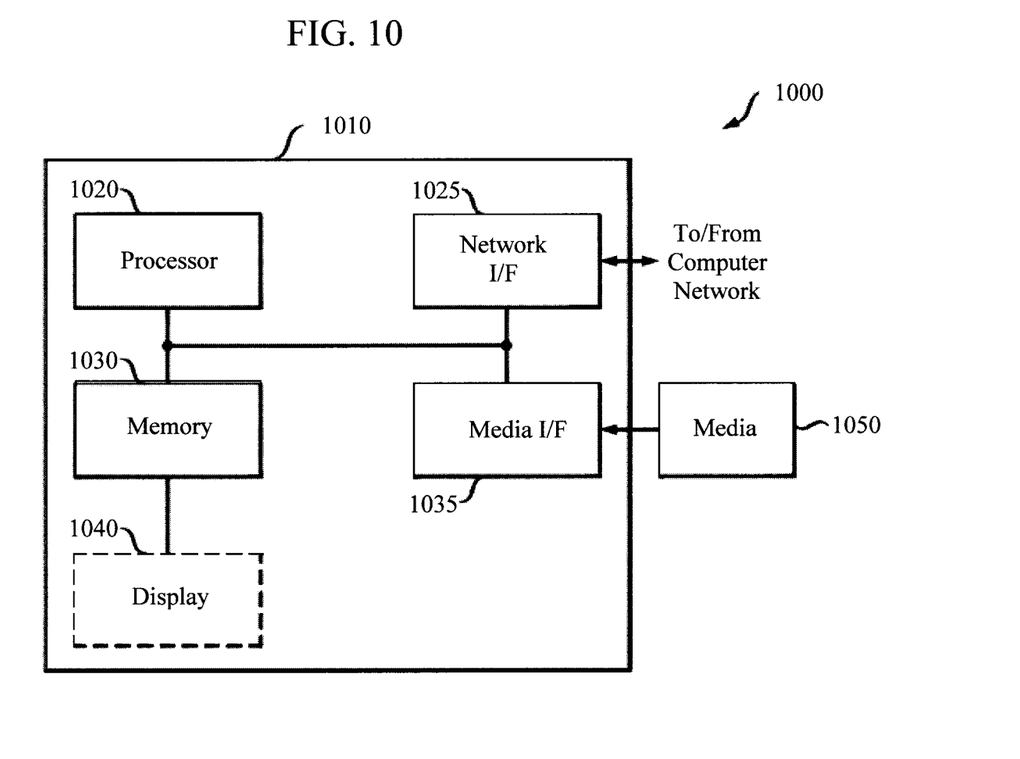
FIG. 10 is a diagram illustrating an exemplary apparatus that can be employed in carrying out one or more of the present techniques according to an embodiment of the present invention.

Turning now to FIG. 10, a block diagram is shown of an apparatus 1000 for implementing one or more of the methodologies presented herein. For instance, apparatus 1000 can be configured to implement one or more of the steps of methodology 100 of FIG. 1 and/or methodology 800 of FIG. 8.

Apparatus 1000 includes a computer system 1010 and removable media 1050. Computer system 1010 includes a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional display 1040 is any type of display suitable for interacting with a human user of apparatus 1000. Generally, display 1040 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for rasterizing three-dimensional (3D) point cloud data, the method comprising the steps of:
   obtaining the 3D point cloud data;
   generating a digital elevation model (DEM) from the 3D point cloud data;
   decomposing the DEM into local and global fluctuations using a Fourier transform to obtain a local DEM by applying a high pass filter to the Fourier transform;
   generating geo-referenced shapes by automatically thresholding the local DEM;
   cropping the local DEM using minimum bounding boxes derived from the geo-referenced shapes and manual annotations from subject matter experts to create a cropped DEM; and
   linking geo-spatially tagged labels from the subject matter experts to the cropped DEM.

2. The method of claim 1, wherein the 3D point cloud data is obtained using LiDAR (light detection and ranging) imaging from surveying at least one geographic area.

3. The method of claim 1, wherein the step of generating the DEM comprises the step of:
   classifying the 3D point cloud data into i) bare ground and ii) above bare ground.

4. The method of claim 1, wherein the 3D point cloud data comprises multiple returns, and wherein measurements from a last return are considered to be originating from ground structures.

5. The method of claim 4, further comprising the step of:
   converting the measurements from the last return to a regular grid.

6. The method of claim 1, wherein the step of decomposing the DEM into the local and global fluctuations comprises the step of:
   subtracting a mean of a neighborhood patch from each grid point on the DEM.

7. The method of claim 1, wherein the local DEM is cropped based on overlap between the MBBs and the MAs.

8. The method of claim 1, further comprising the step of:
   using the cropped DEM to train a machine learning process to identify objects of interest.

9. The method of claim 8, further comprising the step of:
   using the machine learning process that has been trained to identify the objects of interest in 3D point cloud data from an unknown terrain.

10. A computer program product for rasterizing 3D point cloud data, the computer program product comprising a computer readable storage medium having program instructions embodied therewith, the program instructions executed by a computer to cause the computer to:
    obtain the 3D point cloud data;
    generate a DEM from the 3D point cloud data;
    decompose the DEM into local and global fluctuations using a Fourier transform to obtain a local DEM by applying a high pass filter to the Fourier transform;
    generate geo-referenced shapes by automatically thresholding the local DEM;
    crop the local DEM using minimum bounding boxes derived from the geo-referenced shapes and manual annotations from subject matter experts to create a cropped DEM; and
    link geo-spatially tagged labels from the subject matter experts to the cropped DEM.

11. The computer program product of claim 10, wherein the 3D point cloud data is obtained using LiDAR (light detection and ranging) imaging from surveying at least one geographic area.

12. The computer program product of claim 10, wherein the program instructions when executed by the computer to generate the DEM further cause the computer to:
    classify the 3D point cloud data into i) bare ground and ii) above bare ground.

13. The computer program product of claim 10, wherein the 3D point cloud data comprises multiple returns, and wherein measurements from a last return are considered to be originating from ground structures.

14. The computer program product of claim 13, wherein the program instructions further cause the computer to:
   convert the measurements from the last return to a regular grid.

15. The computer program product of claim 10, wherein the program instructions when executed by the computer to decompose the DEM into the local and global fluctuations further cause the computer to:
   subtract a mean of a neighborhood patch from each grid point on the DEM.

16. The computer program product of claim 10, wherein the program instructions further cause the computer to:
   use the cropped DEM to train a machine learning process to identify objects of interest; and
   use the trained machine learning process that has been trained to identify the objects of interest in 3D point cloud data from an unknown terrain.

\* \* \* \* \*